United States Patent [19]

Finell et al.

[11] Patent Number: 5,240,756
[45] Date of Patent: Aug. 31, 1993

[54] TARPAULIN

[75] Inventors: John Finell, Pietarsaari; Christer Cederblom, Kolppi, both of Finland

[73] Assignee: Wisapak Oy Ab, Pietarsaari, Finland

[21] Appl. No.: 640,312

[22] PCT Filed: Jul. 24, 1989

[86] PCT No.: PCT/FI89/00138

§ 371 Date: Jan. 28, 1991

§ 102(e) Date: Jan. 28, 1991

[87] PCT Pub. No.: WO90/01433

PCT Pub. Date: Feb. 22, 1990

[30] Foreign Application Priority Data

Aug. 4, 1988 [FI] Finland .................. 883650

[51] Int. Cl.$^5$ .................. E04D 1/34; E04D 5/00; B32B 3/02; B32B 23/02

[52] U.S. Cl. .................. 428/45; 428/193; 428/226; 428/258; 428/259; 52/3; 52/4; 52/5

[58] Field of Search .................. 428/193, 226, 45, 258, 428/259; 52/3, 4, 5

[56] References Cited

U.S. PATENT DOCUMENTS

| 1,871,571 | 8/1932 | Weber .................. 428/99 X |
| 2,455,237 | 11/1948 | Davis .................. 52/3 X |
| 2,942,327 | 6/1960 | Corry .................. 428/258 |
| 3,521,927 | 7/1970 | Barry .................. 296/100 |
| 3,930,091 | 12/1975 | Lewis et al. .................. 428/258 |
| 4,113,907 | 9/1978 | Haage et al. .................. 428/193 X |
| 4,252,850 | 2/1981 | de Winter .................. 428/193 X |
| 4,298,645 | 11/1981 | Obayashi et al. .................. 428/110 |
| 4,574,107 | 3/1986 | Ferrari .................. 428/259 |
| 4,589,804 | 5/1986 | Paeglis et al. .................. 428/193 X |
| 4,590,121 | 5/1986 | Mahr .................. 428/258 |
| 4,590,715 | 5/1986 | Pandell .................. 428/193 X |

FOREIGN PATENT DOCUMENTS

| 197560 | 5/1958 | Austria .................. 52/3 |
| 2939301 | 4/1981 | Fed. Rep. of Germany .................. 52/3 |
| 3613067 | 10/1987 | Fed. Rep. of Germany . |
| 0061393 | 7/1948 | Netherlands .................. 52/3 |
| 647986 | 2/1985 | Switzerland . |
| 1562638 | 3/1980 | United Kingdom . |
| 2079215 | 1/1982 | United Kingdom . |
| WO8900934 | 2/1989 | World Int. Prop. O. . |

OTHER PUBLICATIONS

Derwent Abstract.

Primary Examiner—George F. Lesmes
Assistant Examiner—Terrel Morris
Attorney, Agent, or Firm—Scully, Scott, Murphy & Presser

[57] ABSTRACT

The invention relates to a tarpaulin (1) comprising a woven basic fabric (2) made waterproof, and several fastening means (5,6) for fastening the tarpaulin (1) to a transport means. A problem with previous tarpaulins has been that they are not alone able to bind the load but chains, for instance, have to be used. This problem is avoided by means of a tarpaulin according to the invention, which is characterized in that the warp yarns of the basic fabric (2) are multifilament yarns, and that areas (3) woven mainly with flat-film as weft yarns and reinforced areas (4) woven with multifilament weft yarns having a greater thickness and tensile strength than warp yarns alternate in the basic fabric in the warp direction, the fastening means (5,6) being attached to the reinforced areas (4) of the basic fabric (2).

10 Claims, 1 Drawing Sheet

TARPAULIN

The invention relates to a tarpaulin comprising fastening means for fastening the tarpaulin to a transport means.

BACKGROUND OF THE INVENTION

Tarpaulins of this type are used widely during transport to protect the load against rain and snow or other disadvantageous environmental or weather effects. Tarpaulins are usually made of woven and/or laminated polyethene or polypropylene. They usually comprise cords or the like means for binding the tarpaulin to the transport means and for tightening it over the load. Prior art tarpaulins, however, are not alone able to keep the load in position during transport, because they are easily torn under the influence of the weight of the load when a ship sways or when a lorry brakes suddenly, for instance. According to regulations, a load should be fastened so as to withstand forces of 1 G in every direction in transport by sea and forces of 1 G in the forward direction and forces of 0.5 G in the backward or any other direction in transport by land. In order to comply with the regulations, the load has to be fastened separately by means of various irons and chains, which requires several workmen at the different transport stages and in many cases also machines for displacing heavy irons and chains. Similarly, the load fastening means are difficult to detach at the receiving end. The fastening means are not usually returned by the receiver, which increases the cost of transport. In addition, the fastening chains may damage the load, e.g., tear down paper rolls.

SUMMARY OF THE INVENTION

The object of the present invention is to eliminate the above problems and disadvantages.

This is achieved by means of a tarpaulin of the type described in the preamble, which according to the invention is characterized in that the warp yarns of the basic fabric are multifilament yarns, and that areas woven mainly with flat-film yarns as weft yarns and reinforced areas woven with multifilament weft yarns having a greater thickness and tensile strength than the warp yarns alternate in the basic fabric in the warp direction, the fastening means being attached to the reinforced areas of the basic fabric.

The tarpaulin according to the invention is sufficiently durable to be used both for the packing and protection of the load as well as for the fastening of the load so as to comply with the above-mentioned regulations. No other fastening means are needed.

Since the fastening means are attached to the reinforced areas of the tarpaulin, the strains caused by the load are mainly exerted on these reinforced areas. For this reason, the areas between the reinforced areas can possess considerably poorer tensile strength. This involves several advantages.

First, the use of thick multifilament weft yarns increases remarkably the weight of the tarpaulin. As such thick multifilament yarns are used only in relatively narrow zones while flat-film yarn is used in the zones between them, the tarpaulin is sufficiently light to be handled by a single workman who is able to cover the load easily and rapidly with resultant savings in labour costs.

Second, the use of relatively narrow reinforced areas reduces the cost of manufacture of the tarpaulin and, as a consequence, its price, because thick multi-filament yarn is considerably more expensive than flat-film yarn. The cost of manufacture is largely dependent on the time spent on weaving. The solution according to the invention thus provides a tarpaulin which withstands high loads while the weight and price of the tarpaulin are optimized.

The invention will now be described in more detail by way of example with reference to an embodiment shown in the attached drawings, wherein

DETAILED DESCRIPTION OF THE INVENTION

Figure 1:
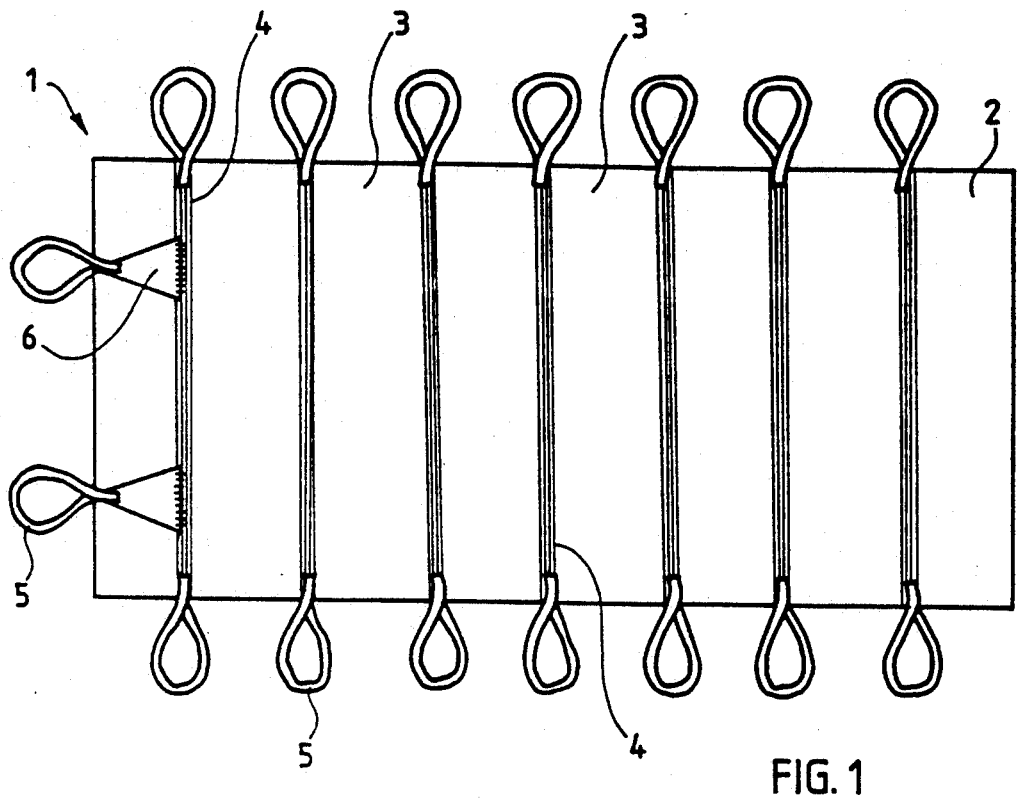
FIG. 1 is a planar view of a tarpaulin according to the invention.
Figure 2:
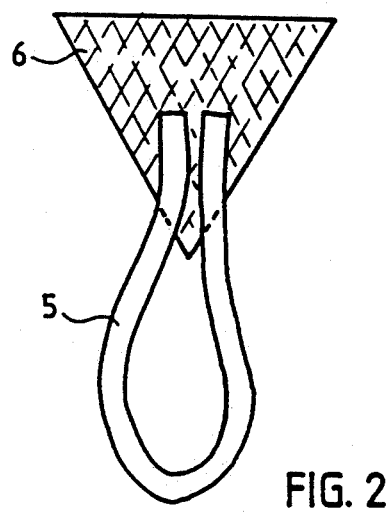
FIG. 2 shows a fastening means to be used at the ends of the tarpaulin.

FIG. 1 shows a specific tarpaulin according to the invention. The tarpaulin 1 comprises a woven basic fabric 2 of desired shape, in this particular case rectangular. In FIG. 1, the warp yarns extend in the horizontal direction and the weft yarns in the vertical direction.

Reinforced areas 4 woven with relatively thick multifilament weft yarns and weaker areas 3 woven with flat-film yarn as weft yarn alternate in the basic fabric 2. The warp yarns of the basic fabric are multifilament yarns preferably thinner than those used as weft yarns in the reinforced areas. The warp yarn should, however, have sufficient tensile strength to prevent longitudinal stretching or tearing of the tarpaulin.

As used herein, the term "multifilament yarn" refers to synthetic fiber yarn comprising at least several tens of filaments, preferably hundreds of filaments. Yarns manufactured by the multifilament technique are well known in the art. In the preferred embodiment of the invention, the multifilament yarns are made of polypropylene or polyester. Other suitable material can be used as well.

The flat-film yarn used as weft yarn is also well known in the art. In the preferred embodiment of the invention, the flat-film yarn is made of high-density polyethylene (HDPE) but other suitable materials can be used as well.

If there are sharp points in the load that may tear the unreinforced areas of the tarpaulin, part of the flat-film yarns used as weft yarns in these areas can be replaced with, e.g., multifilament yarns of the same thickness as the warp yarn. For instance, every forth flat-film yarn may be replaced with a multifilament yarn.

The basic fabric 2 is not usually fully waterproof as such but it has to be treated to obtain good water-proof properties. In the preferred embodiment of the invention, the basic fabric 2 is coated with a tough, weatherproof and water-proof plastic film.

In order to reduce the weight and the price of the tarpaulin, the reinforced areas 4 are usually substantially narrower than the unreinforced areas 3. The spacing between the reinforced areas depends mainly on the position and number of the fastening points in the transport means. A container bottom or platform typically comprises fastening points at intervals of 80 to 120 cm. A tarpaulin suited for such a container platform may comprise a corresponding number of reinforced areas having a width of about 10 to 30 cm. However, it is to be noted that the width, number and spacing of the reinforced areas may vary considerably in different applications.

A fastening means such as a fastening band 5 for fastening the tarpaulin to the transport means is attached to or close to one end of each reinforced area 4 by stitching or in some other way. In the preferred embodiment of the invention, each fastening band 5 forms a loop, whereby its both ends are attached to the reinforced area 4 of the tarpaulin 1. This facilitates the fastening and tightening of the tarpaulin as any type of additional fastening means can be connected to the fastening band loop 5 and fastened to the transport means and tightened in a suitable manner. This provides a further advantage in that when detaching the tarpaulin, this additional fastening band can be cut off while the fastening band loop 5 attached to the tarpaulin 1 remains undamaged so that the tarpaulin can be reused if required. Of course, it is likewise possible to attach the fastening band to the tarpaulin 1 in such a manner that it does not form a loop or in any other suitable way.

Since the fastening means at the ends of the tarpaulin 1 strain the tarpaulin in a direction perpendicular to the reinforced area 4 and parallel to the warp yarns, the fastening means 5 are attached to the basic fabric 2 on all sides by means of a triangular fastening piece 6 woven of multifilament yarns, for instance. The triangular piece 6 of woven fabric is stitched onto the basic fabric 2 in such a manner that one of its sides extends in parallel with the weft yarns of the basic fabric 2, and the warp and weft yarns of the piece 6 of fabric are substantially parallel with the other two sides of the piece 6 of fabric. Both ends of the preferred fastening band loop 5 are stitched onto the triangular piece 6 of fabric, preferably onto a point opposite to the first-mentioned side, whereby the point load exerted by the fastening band loop 5 is transferred via the triangular piece 6 over a wider area within the tarpaulin and does not cause stretching of the tarpaulin in the longitudinal direction. The triangular piece 6 is dimensioned so as to correspond to the strength of the basic fabric. If the tensile strength of the reinforced areas is three times that of the basic fabric 2, the length of the side of the triangle 6 may be three times the width of the reinforced area 4. By means of the piece 6, the fastening means 5 can be attached anywhere in the basic fabric. The length of the side of the triangular piece is preferably about 40 to 70 cm. A very durable triangular piece 6 of fabric is achieved by bending a square piece of fabric into triangular shape in such a manner that the warp and weft yarns of the piece 6 of fabric are diagonally positioned as described above.

By means of the tarpaulin according to the invention, a load can be fastened as desired even though the tarpaulin would cover only the top of the load. In one embodiment of the invention, the basic fabric of the tarpaulin is dimensioned so as to cover the top of the load while skirt portions of a lighter water-proof weather protection material are attached by stitching or in some other way to the edges of the basic fabric so that the size of the tarpaulin is increased to such an extent that the lower part of the load will be covered as well. In this way the weight and the cost of manufacture of the tarpaulin can be further reduced.

The figures and the description related thereto are only intended to illustrate the invention. In its details, the tarpaulin according to the invention may vary within the scope of the attached claims.

We claim:

1. A tarpaulin comprising a woven fabric coated with a plastic film to provide waterproof properties, the basic fabric comprising a) multifilament warp yarns, b) first unreinforced areas where the weft yarns are mainly flat film yarns, c) second reinforced areas where the weft yarns are multifilament yarns of a greater thickness and tensile strength than the multifilament warp yarns, and
   fastening means attached to the reinforced areas of the basic fabric for fastening the tarpaulin to a separate transport means.

2. A tarpaulin according to claim 1, wherein the reinforced areas of the basic fabric are more narrow than the areas in which the weft yarns are flat-film yarns.

3. A tarpaulin according to claim 2, wherein the reinforced areas of the basic fabric are positioned at intervals of about 80 to 120 cm and that their width is about 10 to 30 cm.

4. A tarpaulin according to claim 1, wherein every forth weft yarn is a multifilament yarn in those areas of the basic fabric in which the weft yarns are mostly flat-film yarns.

5. A tarpaulin comprising a woven basic fabric made waterproof with a plastic film, and several fastening means for fastening the tarpaulin to a separate transport means, wherein warp yarns of the basic fabric are multifilament yarns, and that areas woven mainly with flat-film yarns as weft yarns and reinforced areas woven with multifilament weft yarns having a greater thickness and tensile strength than the warp yarns alternate in the basic fabric in the warp direction, at least one fastening band being attached to each end of each reinforced area.

6. A tarpaulin comprising a woven basic fabric made waterproof with a plastic film, and several fastening means for fastening the tarpaulin to a separate transport means, including multifilament warp yarns, and flat-film weft yarns and multifilament weft yarns having greater tensile strength than the warp yarns which alternate in the basic fabric in the warp direction; and
   at least one triangular piece of fabric attached to the basic fabric on sides perpendicular to the warp yarns, the piece of fabric being stitched onto the basic fabric on all sides in such a manner that one side of the piece of fabric is substantially parallel to the weft yarns of the basic fabric and the warp and weft yarns of the piece of fabric are substantially parallel to the other sides, the fastening bands being attached to the triangular piece of fabric onto a point opposite the first-mentioned side.

7. A tarpaulin according to claim 6, wherein the length of the side of the triangular piece of fabric is about 40 to 70 cm.

8. A tarpaulin according to claim 1, 5, or 6, wherein the multifilament yarns are polypropylene or polyester yarns and the weft yarns are polyethylene flat-film yarns.

9. A tarpaulin according to claims 1, 5 or 6, wherein the basic fabric of the tarpaulin is dimensioned so as to cover the top of a load, water-proof skirt portions being attached to the edges of the basic fabric so as to cover the lower portion of the load.

10. A cargo fixing cover comprising a waterproof plastic coated basic fabric having multifilament warp yarns and weft yarns including flat-film weft yarns and multifilament weft yarns wherein the multifilament weft yarns include several tens of filaments and alternate with flat-film weft yarns in the warp direction.

* * * * *

UNITED STATES PATENT AND TRADEMARK OFFICE
CERTIFICATE OF CORRECTION

PATENT NO. : 5,240,756
DATED : August 31, 1993
INVENTOR(S) : John Finell, et al.

It is certified that error appears in the above-indentified patent and that said Letters Patent is hereby corrected as shown below:

Column 1, line 4: after "comprising" insert
--a woven basic fabric made water-proof, and several--

Column 4, line 2, Claim 1: after "woven" insert
--basic--

Signed and Sealed this

Tenth Day of May, 1994

Attest:

BRUCE LEHMAN

Attesting Officer      Commissioner of Patents and Trademarks